United States Patent [19]

Howe

[11] Patent Number: 5,328,199
[45] Date of Patent: Jul. 12, 1994

[54] VEHICLE ALIGNMENT ASSISTANCE DEVICE

[76] Inventor: Reginald G. Howe, Brook House Coombe Lane, Ascot, Berkshire, England, SL5 7DQ

[21] Appl. No.: 979,873
[22] PCT Filed: Aug. 28, 1991
[86] PCT No.: PCT/GB91/01445
  § 371 Date: Feb. 25, 1993
  § 102(e) Date: Feb. 25, 1993
[87] PCT Pub. No.: WO92/03303
  PCT Pub. Date: Mar. 5, 1992

[30] Foreign Application Priority Data

Aug. 28, 1990 [GB] United Kingdom ............ 9018778.2

[51] Int. Cl.⁵ .......................... B60D 1/36; B60Q 1/00
[52] U.S. Cl. .................................... 280/477; 340/686
[58] Field of Search ......................... 280/477; 340/686

[56] References Cited

U.S. PATENT DOCUMENTS

| 3,734,539 | 5/1973 | Salmi | 280/477 |
| 4,065,147 | 12/1977 | Ross | 280/477 |
| 4,614,356 | 9/1986 | Mills | 280/477 |
| 4,687,220 | 8/1987 | Danielson | 280/477 |
| 4,856,200 | 8/1989 | Riggs | 33/264 |

FOREIGN PATENT DOCUMENTS 2161769 1/1986 United Kingdom .

Primary Examiner—Mitchell J. Hill

[57] ABSTRACT

A vehicle alignment assistance device which enables a towing vehicle to be aligned with a trailer in such a manner that the towing ball at the rear of the vehicle will be vertically aligned with the towing socket attached to the trailer. A visible target is located at the forward end of an extendable rod located within a box to be attached to the front of the trailer. A sighting mark is located on the rear window of the towing vehicle. When the target-carrying member (rod) is extended from the box so that the target is in contact with the sighting mark on the towing vehicle, the towing socket will be vertically aligned with the towing ball. A driver of the vehicle backs the vehicle toward the trailer until the target carried at the end of the extended rod touches the sighting mark on the rear window. The rod can be pivotally mounted in the box, which can provide a waterproof storage for the rod when not in use as an alignment aid.

18 Claims, 4 Drawing Sheets

VEHICLE ALIGNMENT ASSISTANCE DEVICE

BACKGROUND OF THE INVENTION

1. Field of the Invention

This invention is concerned with the provision of assistance to vehicle drivers in aligning a towing or tractor vehicle with a trailer to be attached thereto.

2. Description of the Prior Art

There are many forms of attachments for connecting trailers to towing vehicles, but one for which the invention is particularly, though not exclusively, intended is that in which an upwardly directed ball is mounted at the rear of the towing vehicle and a downwardly directed socket is mounted at the front of the trailer. The socket is usually at the forward end of a towbar projecting from the trailer and the ball is usually projecting behind the rear bumper of the towing vehicle. In the case of a lightweight trailer with one axle, it is possible to lift the front of the trailer by the towbar and manoeuvre the trailer until the socket is over the ball and can be lowered onto it and attached thereto. However, in the case of close-coupled twin axle trailers, this is not so easy and a jockey wheel of adjustable height is often provided on the towbar, by which the height of the towbar can be adjusted so that the socket clears the ball for detachment and attachment. The jockey wheel can also be used to lift the front of the trailer, so that one of the pairs of wheels is lifted clear of the ground to make manoeuvring easier. Nevertheless, with heavy loads in the trailer, such as horses, boats of the contents of a caravan, it is much easier to leave the trailer at the point of detachment and to reverse the towing vehicle into position with the ball under the socket when attachment is again required.

However, it is still not easy to reverse the towing vehicle exactly into the position required to within a few centimeters. This is particularly the case when the driver of the towing vehicle is trying to attempt the manoeuvre alone. It may not be so difficult to align the towing vehicle in the lateral direction, though experience suggests that even this may require several attempts. But in order to place the ball exactly under the socket, it is necessary to align the vehicle with the trailer in the fore-and-aft direction. Without being able to see the ball or socket, as they are too low in most cases, this is very difficult.

By the invention, the alignment of a towing vehicle with a trailer in the lateral and/or fore-and-aft direction is rendered much easier.

SUMMARY OF THE INVENTION

According to the invention, a vehicle alignment device for a towing vehicle and trailer, comprising a visible target located on the trailer in predetermined relationship with a socket to be attached to a ball on the towing vehicle, and a sighting mark on a rear window of the towing vehicle in a corresponding predetermined relationship with the ball, the predetermined relationship being such as to enable the target to come into contact with the rear window when the ball is under the socket, is characterised in that the target is at the forward end of a carrying member which is telescopic or folding, in order to be retractable into an inoperative position within a box adapted to be secured to the front of the trailer.

The carrying member may be so mounted in the box as to be movable at will out of the box to locate the target in its predetermined relationship with the socket. This is in order that there be no forwardly projecting member on the trailer liable to damage.

The carrying member may conveniently be pivotally mounted within the box.

For the convenience of users, the target and its carrying member could be permanently mounted on the front of the trailer within a waterproof box secured thereto. Thus the box may have a closure which is closable to render the box waterproof when the carrying member and target are within the box in the inoperative storage position. For use, the carrying member would be pivoted from an upright position to a horizontal position and drawn out to its full extent to place the target in its predetermined relationship with the socket. The length of the fully extended carrying member would need to be pre-set to suit the particular trailer and towing vehicle rear window position. This would be done with the socket clear of the ball and above it to allow the towing vehicle to move away freely from the trailer.

Because the rear windows of towing vehicles may be at different angles to the vertical, the target may be angularly adjustable on the carrying member. For manoeuvres which occur in conditions of poor visibility, it may be advantageous to make the target of fluorescent material, or to coat its forward face with fluorescent material.

The sighting mark on the rear window of the towing vehicle is preferably a circle and the target a similar circular disc, so that the approach of the target to the rear window could be observed by the enlargement of the target within the sighting mark. However, to allow for towing vehicle drivers of different heights, it may be convenient to have a pair of parallel vertical lines as well, one on each side of the sighting mark.

The scope of the present invention is defined by the appended claims, and how it can be carried into effect is hereinafter particularly descibed with reference to the accompanying drawings in which:

DESCRIPTION OF THE PREFERRED EMBODIMENTS

Figure 1:
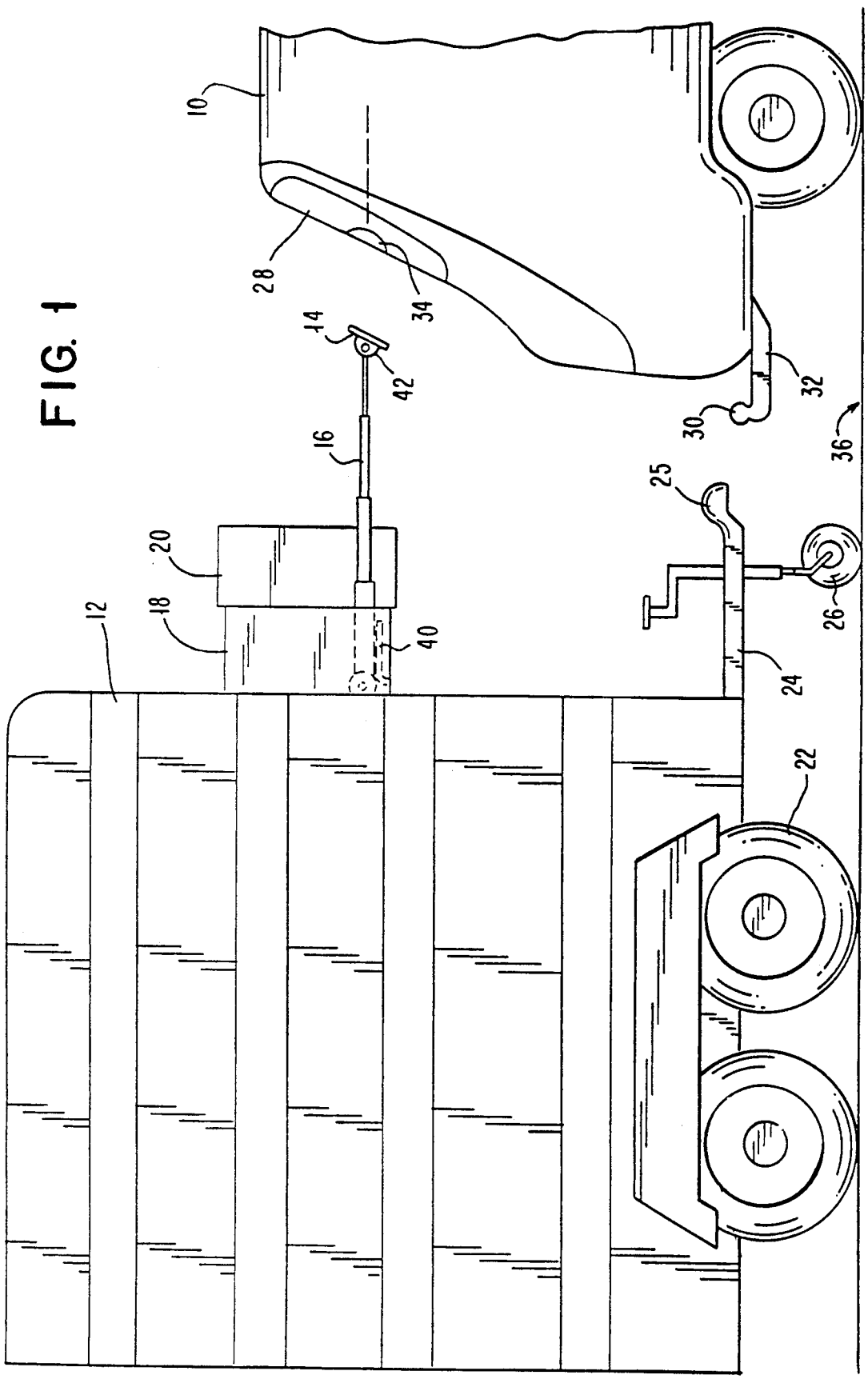
FIG. 1 is a diagrammatic side view, partly broken away, of portions of a towing vehicle and trailer with a device according to the present invention in position prior to reversal of the towing vehicle to attach the trailer thereto.
Figure 4:
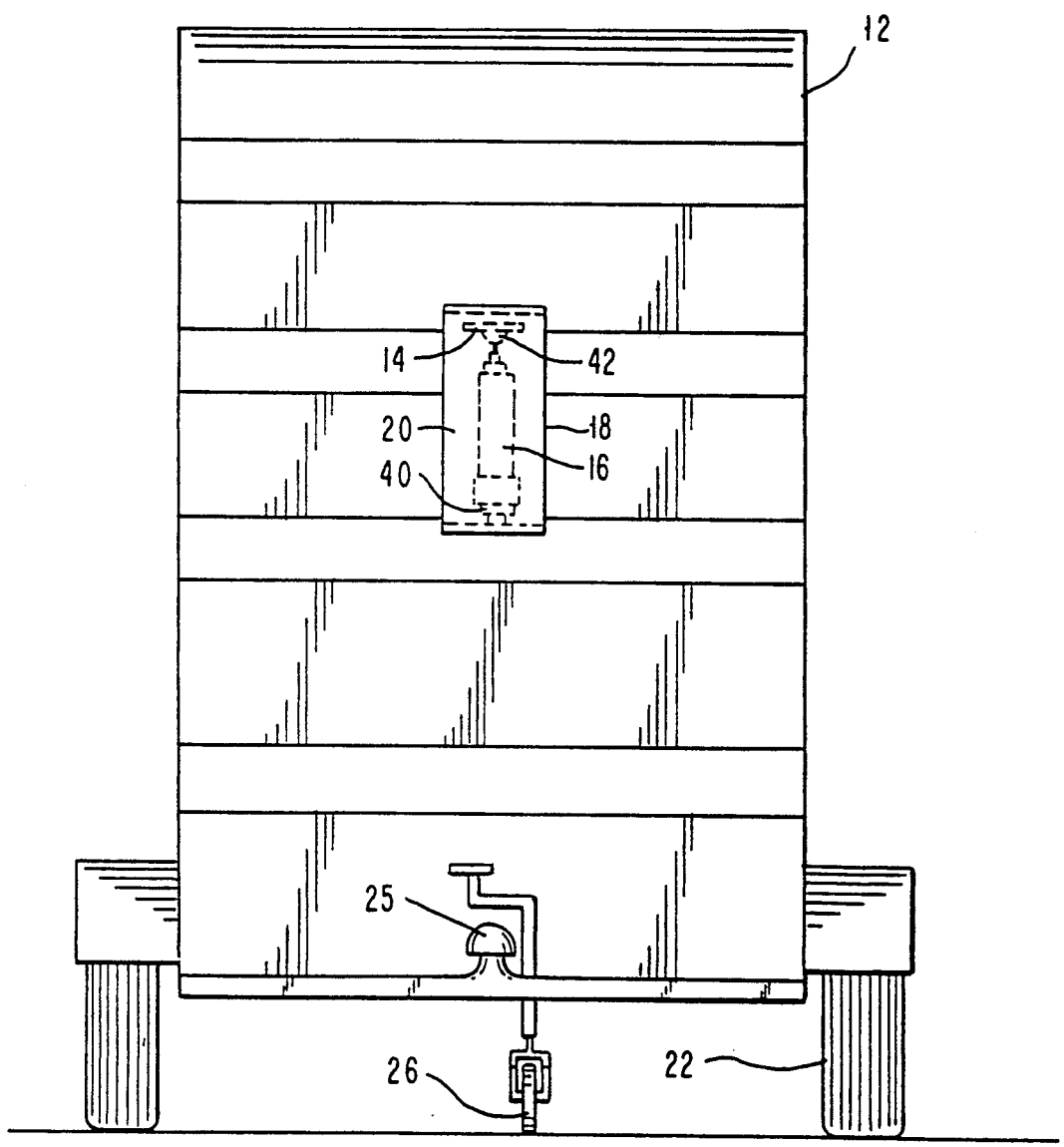
FIG. 4 is a diagrammatic view of the front end of the trailer with the target and its carrying member within the box secured to the trailer.

In a preferred embodiment of the present invention, a vehicle alignment assistance device is mounted on a towing vehicle 10 and a trailer 12 (FIG. 1). The device includes a target in the form of a circular disc 14 mounted at the forward end of a telescopic carrying arm 16. The carrying arm 16 is pivotally mounted in a box 18 mounted on the front wall of the trailer 12, so as to be movable between a horizontal position (FIGS. 1, 2) in which it can be extended telescopically or retracted likewise, and a vertical position (FIG. 4) with the target end uppermost within the box 18. The box 18 has a hinged door (shown in the open position) 20 by which it may be closed with the target and carrying member therewithin, against water, dust and debris.

The trailer 12 is supported upon four wheels 22 on close-coupled twin axles, and has a forwardly projecting towbar 24 with a socket 25 at its forward end and an adjustable height jockey wheel 26 by which the towbar 24 may be lifted. The towing vehicle 10 has a rear window 28 and a ball 30, complementary to the socket and mounted on a rearwardly projecting arm 32. The sighting mark is in the form of a circular or annular mark 34 on the rear window 28, for example on a transparency stuck to the inside of the window.

Figure 2:
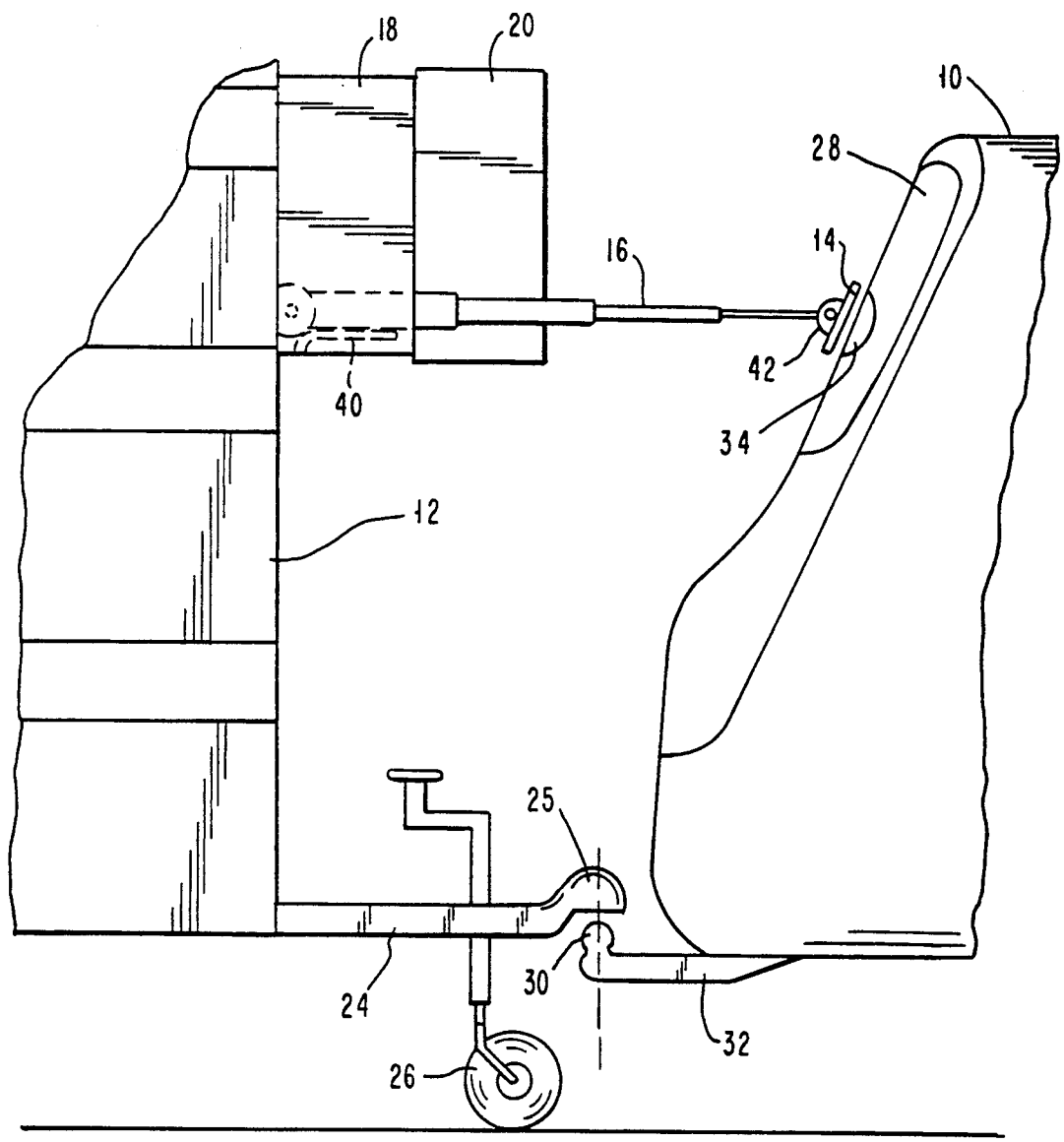
FIG. 2 is a similar view to FIG. 1, with more parts broken away, but with the towing vehicle in the position for attachment, though detached.
Figure 3:
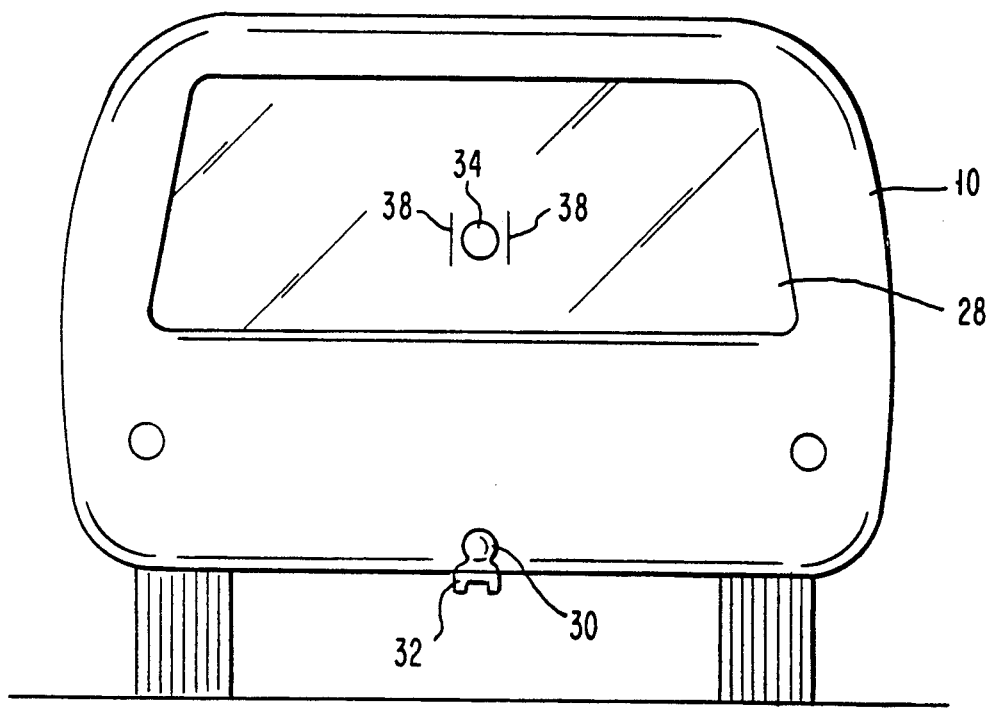
FIG. 3 is a diagrammatic view from the rear of the rear portion of the towing vehicle with the sighting mark in position.

The device is mounted on the vehicle 10 and trailer 12 when they are in the detached position ready for attachment, as shown in FIG. 2. This may be achieved by halting and braking the attached vehicle and trailer on flat ground 36, releasing the ball and socket and lifting the towbar 24 by means of the adjustable jockey wheel 26 until the socket 25 is clear of the ball 30 by a small and predetermined distance sufficient to allow the vehicle 10 to be driven away. The expected driver remains in the vehicle and adopts the most comfortable position for reversing the vehicle, which may involve the driver looking in a mirror or turning to look over the shoulder. Whether reflected or direct vision is used, the line of sight should be horizontal or substantially so. The mark 34 is placed on the rear window 28 and secured thereto, preferably by self-adhesion, at the same height as the eyes of the driver or at mirror height. Then the box 18 is held against the front wall of the trailer 12 with the door 20 open and the telescopic arm 16 partially extended horizontally. The arm 16 is then extended until the target disc 14 comes into contact with the rear window 28 and its length in that position is measured. The arm 16 is then swung away from the horizontal position and its fully extended length is reduced to the measured length, for example by cutting the end section and re-attaching the target disc 14. As an alternative, a mark may be made on one of the sections, preferably the end section, of the arm 16 to indicate the extent to which the arm 16 is to be telescopically extended to reach the measured length. The box 18 is then secured to the front wall of the trailer 12 at the same, or substantially the same, height as the mark 34 on the rear window 28.

In use, the coupled vehicle and trailer with the device retracted within the box, are driven to a selected site and braked there. The socket and ball are released and the jockey wheel adjusted to lift the towbar to bring the socket clear of the ball by the predetermined and small distance. The vehicle is then driven away. Upon return, the vehicle is halted and braked some distance in front of the trailer, and the box on the front wall of the trailer is opened and the carrying arm pivoted down and extended either to its full extent or to the mark thereon. The target disc is then in position for observation by the vehicle driver through the rear window of the vehicle. The driver then reverses the vehicle, using the mark on the rear window and the target disc to reverse the vehicle accurately towards the trailer until the disc comes into contact with the rear window. By stopping the vehicle when this occurs, the driver can be sure that the ball on the vehicle is under the socket on the trailer ready to receive the socket when the jockey wheel is adjusted to lower the towbar. If the driver reverses too far, the resilience of the carrying arm and its telescopic nature allow the disc to rise up the rear window away from the mark thereon and the driver can then move forward the short distance necessary to allow the disc to drop back again without leaving the rear window.

It may not be possible to ensure that the carrying arm is horizontal or that the line of sight is horizontal. In such case, it is convenient to have two vertical lines, 38 one on each side of the circular mark on the rear window. The mark on the rear window is best positioned at the centre of the window in the lateral direction, as also is the box on the front wall of the trailer. Some adjustment of the position of the target-carrying arm box and the sighting mark may be needed to suit the particular combination of towing vehicle, trailer and driver, but they should be as close as possible to the centreline of the combination at eye or mirror level.

To help ensure that the carrying arm is substantially horizontal when extended, there may be resilient means in the form of a flat spring, 40 for example, engaging the arm in the lowered position in the box to h0ld it against accidental displacement. As most rear windows are sloping, but often at different angles to the vertical, the target disc could be secured to the end section of the telescopic arm by a pivoted connection 42 (FIGS. 1, 2) tightened by means of a butterfly nut, for example, so that the disc can be adjusted to the same angle to the vertical as the portion of the rear window, with which it is arranged to come into contact.

The surface of the target disc is preferably of a colour or texture to enable it to be discerned easily, and for the purpose in conditions of poor visibility, the front surface may be coated with fluorescent material. The disc is preferably of a material which will not damage the surface of the rear window. Although the carrying arm may telescope in a contracting direction when the rear window strikes the target disc, it is preferred to rely upon resilient means to displace the disc upwards so that a clear indication of striking is given. For this purpose, the resilience of the extended telescopic arm may be relied upon or there may be a spring in the box holding the arm horizontal resiliently.

It will be appreciated that in the preferred embodiment, the device comprises a target disc on the forward end of a telescopic carrying arm and an annular sighting mark on the rear window of the vehicle. The carrying arm is pivotally mounted in a box on the front of the trailer and, after contraction, can be stowed within the box in an upright position. The arm can be pivoted to an operative position and extended in a substantially horizontal direction at a height approximately equal to the eye level or mirror level height of the driver. The sighting mark is also at this height. The length of the extended carrying arm is so chosen that the distance between the socket and ball in the horizontal direction is equal to the distance in the same direction between the target disc and the rear window surface with the annular mark. Thus, during reversal of the vehicle towards the trailer, the rear window comes into contact with the disc when the socket is above the ball.

I claim:

1. A vehicle alignment assistance device for a towing vehicle and a trailer, said towing vehicle having a front end, a rear end, a rear window and a towing ball at said rear end, and said trailer having a front end and a rear end, there being at the front end thereof a towing socket to be attached to said towing ball, said device comprising a a sighting mark adapted to be located on said rear window of said towing vehicle in a first predetermined relationship with said towing ball, a box adapted to be secured to the front end of said trailer, a target-carrying member having an aft end located in said box and a forward end that can be extended from said box, a target mounted on the forward end of said target-carrying member to be located in a second predetermined relationship with said towing socket, said first and second predetermined relationships being such as to enable said target to come into contact with said rear window when said towing ball is under said towing socket, said target-carrying member being extendable and contractible in length and mounted in said box so as to be retractable into an inoperative storage position within said box.

2. A device according to claim 1, in which said target carrying member (16) is pivotally mounted within said box (18).

3. A device according to claim 2, in which said box has a closure which is closable to render said box waterproof when said target-carrying member and said target are within said box in said inoperative storage position.

4. A device according to claim 1, in which said box has a closure which is closable to render the box waterproof, when said target carrying member and said target (14) are within said box in the inoperative storage position.

5. A device according to claim 1, in which said target is angularly adjustable on said target carrying member.

6. A device according to claim 1 in which said target has a forward face of fluorescent material.

7. A device according to claim 1, in which said target is circular and said sighting mark is an annulus.

8. A device according to claim 7, in which the sighting mark includes a pair of parallel vertical lines, one on each side of said annulus.

9. A vehicle alignment assistance device for a towing vehicle and a trailer, said towing vehicle having a front end, a rear end, a rear window and a towing ball at said rear end, and said trailer having a front end and a rear end, there being at the front end thereof a towing socket to be attached to said towing ball, said device comprising a box adapted to be secured to the front end of said trailer, a resilient target-carrying member having an aft end located in said box and a forward end that can be extended from said box, said target-carrying member being extendable and contractible in length and mounted so as to be retractable into an inoperative storage position within said box, a target at the forward end of said target-carrying member, said target-carrying member being so mounted in said box as to be movable at will out of said box to locate said target in a first predetermined relationship with said towing socket, and a sighting mark adapted to be located on said rear window of said towing vehicle in a corresponding second predetermined relationship with said towing ball, said predetermined relationships being such as to enable said target to come into contact with said rear window when said towing ball is under said towing socket.

10. A device according to claim 9, in which said target-carrying member is pivotally mounted in said box.

11. A device according to claim 10, in which said box has a closure which is closable to render said box waterproof when said target-carrying member and said target are within said box in said inoperative storage position.

12. A device according to claim 9, in which said box has a closure which is closable to render said box waterproof when said target-carrying member and said target are within said box in said inoperative storage position.

13. A device according to claim 9, in which said target is angularly adjustable on said target-carrying member.

14. A device according to claim 9, in which said target has a forward face of fluorescent material.

15. A device according to claim 9, in which said target is circular and said sighting mark is an annulus.

16. A device according to claim 15, in which said sighting mark includes a pair of parallel vertical lines, one on each side of said annulus.

17. A vehicle alignment assistance device for proper alignment of a towing vehicle and a trailer, said trailer having a front end at which is located a towing socket to be coupled to a towing ball located at a rear end of said towing vehicle, there being a window located at the rear end of said towing vehicle, said device comprising:

a box enclosure adapted to be mounted on the front end of said trailer, a sighting mark adapted to be located on said window at the rear end of said towing vehicle, a target capable of being visually seen through said window by a driver in said towing vehicle, a resilient target-carrying member that is extendable and contractible in length, said member having an aft end held at a fixed location in said box enclosure and a forward end at which said target is pivotally held, said target-carrying member being capable of being extended out of said box enclosure in a horizontal direction over a length sufficient to enable said target to contact said sighting mark, the extended length of said target-carrying member being such that said towing socket is vertically aligned with said towing ball when said target is in contact with said sighting mark, said target-carrying member being retractable into a storage position within said box enclosure.

18. The vehicle alignment assistance device of claim 17, further including means to maintain said target-carrying member in a substantially horizontal plane when said target-carrying member is extended in length.

* * * * *